United States Patent [19]

Villalobos

[11] 4,164,680
[45] Aug. 14, 1979

[54] POLYCRYSTALLINE DIAMOND EMITTER

[76] Inventor: Humberto F. Villalobos, 55 Dartmouth Rd., Williams Bay, Wis. 53191

[21] Appl. No.: 852,022

[22] Filed: Nov. 16, 1977

Related U.S. Application Data

[63] Continuation-in-part of Ser. No. 608,260, Aug. 27, 1975, Pat. No. 4,084,942.

[51] Int. Cl.$^2$ ............................ H01J 1/16; H01J 1/14
[52] U.S. Cl. ................................ 313/336; 250/423 R; 313/311; 313/61 S
[58] Field of Search ................... 313/61 S, 336, 311; 250/423 F

[56] References Cited

U.S. PATENT DOCUMENTS 3,646,841  3/1972  Villalobos ........................... 83/171
4,084,942  4/1978  Villalobos ........................... 83/651 X Primary Examiner—Alfred E. Smith
Assistant Examiner—Charles F. Roberts
Attorney, Agent, or Firm—Robert E. Burns; Emmanuel J. Lobato; Bruce L. Adams

[57] ABSTRACT

Ultrasharp diamond edges and points which are usable as high intensity point sources for the emission of electrons, ions, X-rays, coherent and incoherent light and high frequency electromagnetic radiation are produced by preparing and classifying ultrafine diamond powder having a particle size of 10 to 100 angstroms, placing the powder in a diamond mold defining the ultrasharp edge or point to be produced and applying a pressure of the order of 80 to 90 kb while heating the powder to a temperature of the order of 2440° K. in an ultrahigh vacuum or inert atmosphere after degasing to avoid oxidation of the diamond powder.

11 Claims, 1 Drawing Figure

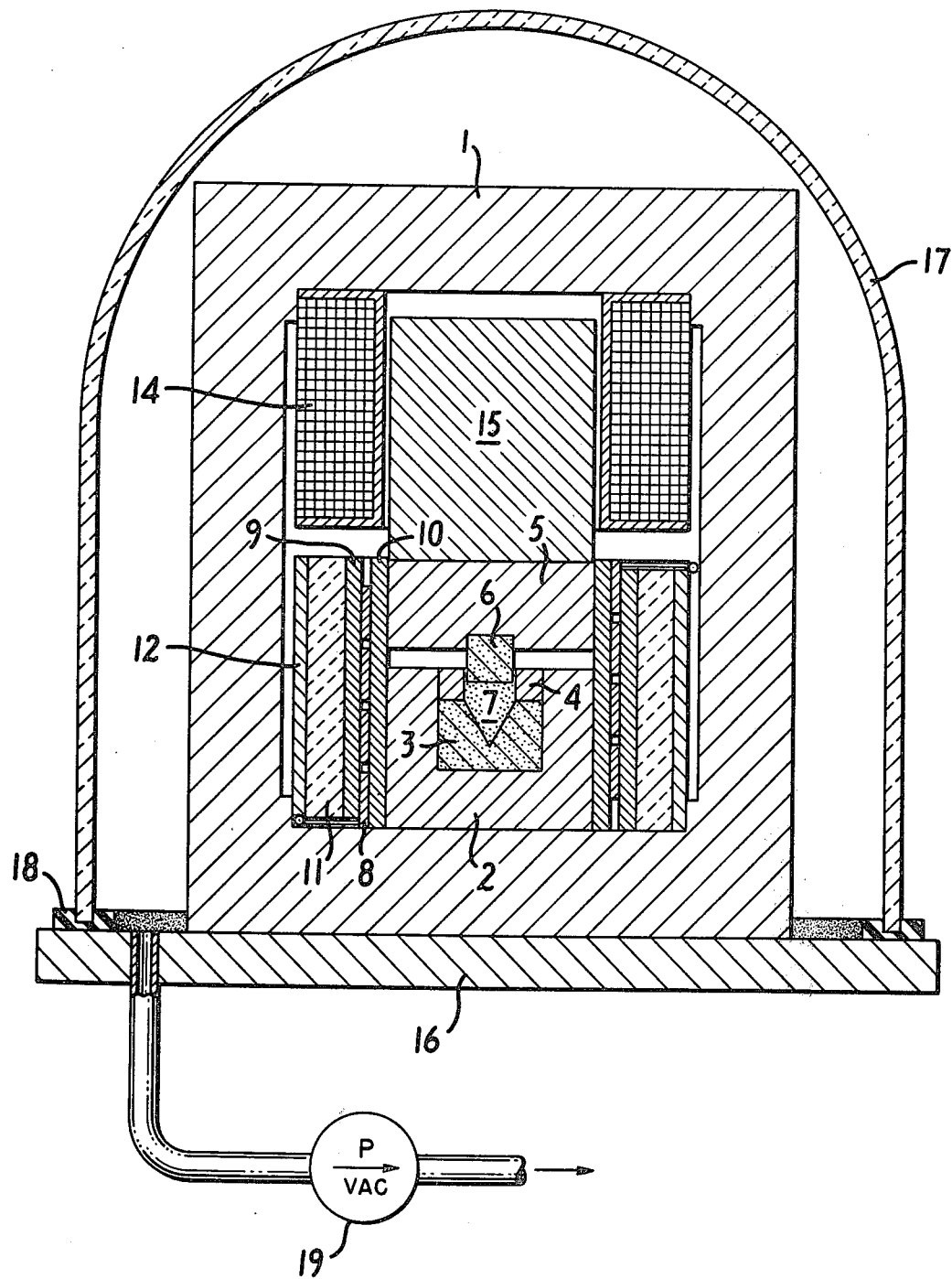

POLYCRYSTALLINE DIAMOND EMITTER

REFERENCE TO PRIOR APPLICATION

The present application is a continuation-in-part of my application Ser. No. 608,260 filed Aug. 27, 1975 and now U.S. Pat. No. 4,084,942, issued May 9, 1978.

FIELD OF INVENTION

The present invention relates to the production of ultrasharp diamond edges and points which are usable as high intensity point sources for the emission of electrons, ions, X-rays, coherent and incoherent light and high frequency electromagnetic radiation.

BACKGROUND OF THE INVENTION

As disclosed in my U.S. Pat. No. 3,646,841, ultrasharp diamond edges are highly useful for molecular and submolecular sectioning at ultralow temperature and as high intensity point sources for the emission of electrons, ions and neutrons. Such ultrasharp diamond edges—commonly referred to as "diamond knives"—have also found other uses. For example diamond knives are used in surgery particularly in delicate operations such as operations on the eye. It has also been found that metals and other materials can be machined with a diamond knife in such manner as to obtain a perfectly smooth surface which is free of the scratches and other imperfections resulting from usual machining and polishing operations.

When used as point sources, diamond edges and points are coated within a thin film of a suitable material such as tungsten, rhenium, lanthanum, barium, caesium and other related materials of suitable work function and physical properties for electron emission. When thus coated, the diamond tip or edge serves as an effective emitter for electrons, ions, X-rays neutrons and other types of emission.

However, the use of ultrasharp diamond edges and points has been limited by the cost of production and by limitations on the size of diamond edges that could be made. As high quality diamond knives are made from diamonds of gem quality, the cost of such knives has accordingly been high. Moreover, by reason of larger diamonds not being available at an economically acceptable price, the length of the cutting edge of a diamond knife has been limited to less than ten millimeters and is usually in the one to three millimeter range. With respect to the use of diamond points and edges as cathodes or other emission electrodes, the useful life of the electrode has been limited by the dissipation of the metallic coating material. When such material has been depleted, it is necessary to discard or recoat the electrode. As such electrodes are normally hermetically sealed in an appropriate envelope, the removal, recoating, remounting and resealing of the electrodes may not be economically feasible.

SUMMARY OF THE INVENTION

It is an object of the present invention further to extend the use of ultrasharp diamond edges and points by making it possible greatly to reduce the cost of such instruments and also to remove the present limitations on size. Moreover, the invention is directed greatly to extending the useful life of ultrafine diamond edges and points used as cathodes or other emitters.

In accordance with the invention ultrasharp diamond edges and points are produced from ultrafine diamond powder by molding and bonding the powder at high temperatures and pressures in an ultrahigh vacuum or an inert atmosphere such as helium. In this manner an implement of any desired size and shape can be produced. Moreover, when the ultrasharp edge or point is to be used for electron or other emission, low work function or other emissive material in finely powdered form can be mixed with the diamond powder so as to be incorporated in the body of the electrode instead of being applied as a surface coating. The useful life of the electrode can thereby be greatly increased.

In order to obtain an ultrasharp edge having a radius of 3 to 100 angstrom units, the diamond powder from which the implement is molded must have a comparable particle size of 3 to 100 angstroms. Diamond powder of a particle size in this range can be obtained by crushing, grinding, explosion, electric arc or thermal shock followed by classification for example by ultrahigh speed centrifuging to separate out the finer particles whereupon oversized particles are further processed.

The bonding of the ultrafine diamond particles to form a molded article having an ultrasharp edge or point is achieved either with or without a binder. For example, ultrafine nickel, chromium, titanium, niobium, zirconium, molybdenum, tungsten, copper, beryllium metal particles or their oxides, may be mixed with the graded ultrafine diamond powder in appropriate amounts (e.g., 10% to 40% by weight) to serve as bonding and catalytic solvent agents. Alternatively, individual particles of the diamond powder can be coated with a suitable metal such as chromium or nickel which acts as a matrix for the diamond particles when the article is molded. Other suitable bonding agents are $LaB_4$ and $LaB_6$. Alternatively, it is found that by using suitable pressure and temperature in an ultrahigh vacuum or in an inert atmosphere such as helium, bonding of the ultrafine diamond particles can be achieved without the use of additives.

BRIEF DESCRIPTION OF DRAWING

The objects and advantages of the invention will be more fully understood from the following description by way of example of a process for producing ultrafine diamond edges and points of the resulting product. The single FIGURE of drawings illustrates schematically and in cross section apparatus used for carrying out the described process.

DESCRIPTION OF PREFERRED EMBODIMENTS

The process of preparing the emitter in accordance with the present invention comprises preparation of ultrafine diamond powder and the high pressure and high temperature molding of the product with or without additives to form an implement having an ultrasharp edge or point. The term "implement" is herein used in a generic sense to denote a knife, cutting tool, electrode, emitter or other article having an ultrasharp edge or point.

Preparation of Powder

The ultrafine diamond powder used in the process of the present invention can be prepared from natural or artificial diamonds of any size. Since the size of the implement to be produced is not dependent on the size of the diamonds it is no longer necessary to use large gem quality diamonds. The cost of the starting material is thereby greatly reduced. One type of diamond that is of interest for certain application is the type IIB semiconductive diamond discovered in 1962. Although diamonds are ordinarily considered to be insulators of high dielectric strength, it has been found that type IIB diamonds are semiconductors. The presence of aluminium and other impurities are apparently related to this unusual property. A relatively plentiful source of this rare type IIB diamond useful for carrying out the process of the present invention is provided by the occurrence of this material in the extensive deposits of natural carbonado and related diamonds found in Venezuela.

The ultrafine diamond powder is suitably prepared from the natural or artificial diamonds by crushing, grinding, mechanical shock as by explosives, an electric arc or thermal shock. The powder thus obtained is classified for example by differential and density-gradient ultracentrifugation of an oil or preferably glycerol suspension of the powder, for example at 60,000 to 100,000×g. By such centrifuging, powder of the requisite fineness, for example a particle size of 3 to 100 angstroms is separated out whereupon particles of larger size are reprocessed until the desired size is obtained.

Orientation of Diamond Particles In Mold

A diamond has a 1-1-1 or tetrahedral face, a 1-0-1 face as viewed edgewise and a 1-0-0 face as viewed from above. The 1-1-1 face is the hardest. Hence, to obtain an ultrasharp edge or point it is desirable to orient the diamond particles in the mold so as to present the 1-1-1 faces at the edge or point of the implement. Such orientation can be effected with a strong magnetic field, a strong electric field or a combination of magnetic and electric fields. This orientation is considerably enhanced when the ultrafine diamond particles or platelets are first coated (by coating with an atomic thin film evaporated in a high vacuum) with nickel, cobalt, iron and other ferromagnetic metals and alloys.

Additives For Bonding

By the use of suitable temperatures, pressures and operative procedures as herein described, the ultrafine diamond particles can be bonded to form a molded implement without the use of an additive as a bonding or binding agent. The diamond particles have the shape of shingles or chips with edges staggered like stairsteps. The chips have a thickness of for example 6 angstrom and a length of 10 to 50 or up to 100 angstroms. When pressed together at high temperature and pressure, these chips or lamina interlock with one another to form a solid body. This is in contrast with graphite particles which slip on one another. Thus, even without the addition of a bonding or binding agent, the ultrafine diamond powder can be effectively bonded.

However, in some instances it is desirable to use additives further to implement bonding. Such additives should have the characteristics of being hard, inert and stable and having a suitable melting or softening temperature so as to assist in bonding the diamond particles during molding. Suitable additives are alumina and especially lanthanum borates ($LaB_4$ and $LaB_6$). It is also desirable in some instances to coat the individual particles of diamond powder with a metal, for example chromium or nickel. The thickness of the coating should not exceed 100 angstroms and preferably should be of the order of 10 to 50 angstroms. When the ultrafine diamond powder thus coated is molded at the pressures and temperatures and under the conditions described below, the metal coating acts as a matrix and contributes to the bonding of the particles. The coating of the particles is conveniently effected electrolytically or by vaporization of the metal.

Additives For Electrical Properties

When the implement produced in accordance with the present invention is intended for use as an electrode or where electrical conductivity is desired, suitable additives are included to provide the desired electrical properties. For example the additive may be one or more of the rare metals including the alkaline-earth metals (barium, calcium and strontium); beryllium, bismuth, cadmium, cobalt, gallium, germanium, hafnium, indium, lithium, boron, silicon, manganese, molybdenum, rhenium, selenium, tantalum, niobium, tellurium, thallium, thorium, titanium, tungsten, uranium, vanadium, zirconium, and the rare earths. In particular, such inclusions may include tungsten, rhenium, lanthanum, barium, caesium and similar materials of suitable work function and physical properties for electron emission. The additive can be in the form of an ultrafine powder which is mixed with the diamond powder or it can be coated on individual particles of the diamond powder as described above with respect to chromium and nickel. The additive for providing desired electrical properties is preferably in combination with nickel, cobalt or other magnetic material which is coated on the individual diamond particles to facilitate orientation of the diamond particles in the mold. In some instances it may be desirable to have the additive only in edge, point or surface portions of the implement. In this event, when the material is being placed in the mold, diamond powder containing the desired additive is positioned at the desired location in the mold while diamond powder without such additive is positioned in other mold locations. If desired, different additives of different properties can be located in different portions of the mold and thus be present in corresponding portions of the molded implement.

Molding Of Implement With Ultrasharp Edge Or Point

In order to obtain a bonding of the ultrafine diamond powder in accordance with the present invention, the implement to be produced is molded at high temperature and high pressure. Thus, for example the pressure used is at least 50 kb and preferably of the order of 85 to 90 kb. The temperature used is at least 2000° K. and preferably of the order of 2440° K. to 2500° K. The temperature used may vary somewhat according to the molding time. For example, with a pressure of 85 to 90 kb, a temperature of 2440° K. is sufficient when the molding time is two minutes whereas it is desirable to use a temperature of 2500° K. when the molding time is reduced to one minute.

Moreover, the high temperature high pressure molding must be effected under conditions under which the diamond powder cannot oxidize. Thus, the molding is carried out in an ultra-high vacuum which avoids oxidation of the diamond powder and also serves as a heat seal. The vacuum should be of the order of $10^{-8}$ to $10^{-9}$ Torr. Alternatively, the high temperature high pressure molding can be carried out in an inert atmosphere for example helium after the diamond powder and its environment have been thoroughly degassed in order to eliminate the presence of oxygen.

The mold used in the process must be formed of material having the strength, hardness and temperature resistance to withstand the stresses and temperature imposed on it during the molding operation. Moreover, the female mold must have the ability of defining on the molded implement an edge or point having the requisite sharpness, e.g., a radius of 10 to 100 angstroms. In order to meet these requirements, both portions of the mold are preferably formed of diamond which may be either natural diamond when size permits or a molded diamond structure produced in accordance with the present invention. Alternatively, the mold can be formed of special ceramics based on ultrafine (10–50Å) particles of aluminum oxide, zirconium oxide or tungstate in an appropriate filler, for example appropriate epoxy plastics. To avoid the molded article sticking to the mold, a suitable lubricant or separating material is used. For example, this can be sodium chloride or graphite.

Apparatus for Carrying out Process of Molding

In the accompanying drawing there is shown schematically molding apparatus for carrying out the molding operation in accordance with the present invention. The apparatus is shown as comprising a hollow rectangular frame 1 of high strength material, for example high tensile steel. On the base portion of the frame 1 there is positioned a mold holder 2 which may likewise be formed of high tensile steel and is provided with a central cavity to receive a female mold 3 formed of a diamond, molded diamond composition or other suitable material. Within the cavity of the mold holder and superposed on the diamond mold, there is provided a collar 4 of hard high strength heat resistant material, for example high tensile steel or tungsten carbide. A second mold holder 5 likewise formed of high tensile steel is provided with a central cavity to receive a male mold 6 likewise formed of natural or molded diamond or other hard material. The diamond powder 7 which is to be molded is confined in a mold cavity defined by the female mold 3, the retaining collar 4 and the male mold 6.

Means is provided for heating the powder to be molded to the required temperature (2440° K. to 2500° K.) during molding. The heating means is shown schematically in the drawings as comprising an electrical resistance heating element 8 surrounding the mold and mold holders. For example, the heating element may comprise a strip of Kantal, rhenium, tungsten or other suitable resistance material. The electrical resistance heating element 8 can surround the mold, as shown, or can be placed directly within the mold, close to a precision thermocouple connected through a suitable amplifier-recorder-feedback circuit to the heater power supply in order to maintain the requisite temperature during the high pressure cycle. The heating element 8 is shown electrically insulated on both sides by layers 9 and 10 of suitable insulating material such as pyrophyllite or lithographic stone. Heat insulation is provided by a thick layer 11 of suitable thermal insulating material such as, pyrophyllite, asbestos or lithographic stone which surrounds the heating element with its electrical insulation. The heating element and electrical and thermal insulation are assembled within a retaining sleeve 12 formed for example of steel.

Instead of heating conductively as shown, heating to the required temperature may be effected by other means, for example by induction heating, microwave radio frequency heat, a laser beam or an electron beam. The ultrahigh vacuum under which the heating is effected facilitates the use of laser or electron beam heating introduced through diamond windows provided in suitable oriented apertures. Alternatively, a cooled copper target bonded to diamond heat sinks (of type IIa diamond) may be used in conjunction with suitably placed electron beam guns embedded in a heat refractory and insulating matrix close to the mold.

Suitable means is provided for applying the required pressure (85 to 90 kb) during molding. As illustrated by way of example in the drawing, the pressure applying means comprises a superconductive electromagnet comprising a superconductive winding 14 and armature 15 formed for example of soft iron or other material having suitable magnetic properties. Superconductivity of the winding is achieved through the use of ultralow temperatures. By virtue of the superconductivity of the winding, the forces required to achieve the desired pressure can be achieved. Suitable cryogenic assemblies and suitable superinsulation (not shown) are provided for maintaining the requisite liquid helium temperatures (4.2° K.) essential for the superconductive solenoid. Other electromagnetic systems may also be used for producing the ultrahigh pressures required in the process of the present invention.

The molding press as thus described is mounted on a steel base 16 and is enclosed by a bell jar or other envelope 17 which seats on the base with a hermetic seal 18. The bell jar 17 can be made of tempered glass but is preferably made of stainless steel fitted with heat resistant vacuum-tight ports or windows arranged for observing the entire process with light microscopes, scanning electron microscopes, X-ray diffraction and X-ray scattering techniques, thermometry and mass-spectrometry for detection of residual gasses. A high vacuum pump is indicated schematically at 19 for producing an ultrahigh vacuum within the envelope 17. If after evacuation to achieve through degasification it is desired to provide in the enclosure an inert atmosphere such as helium, a suitable supply and suitable connections (not shown) are provided. Likewise, suitable elctrical connections are provided for the heating element 8 and the superconductive electromagnet winding 14. Preferably one or more suitable thermocouples are provided for sensing the temperature of the mold.

The female mold 3 is formed in such manner as to provide a cavity which defines on the molded implement an edge or point of the required sharpness. One method of achieving this is to form the mold cavity in a natural diamond or in natural carbonado with a laser beam. Alternatively, a block of molded diamond composition made in accordance with the process of the present invention can be used as a mold body in which the cavity is thus formed. Alternatively, the female mold can be formed by the powdered diamond technique as herein described with the use of natural or molded diamond knife to produce the mold cavity during the molding operation.

Molding Operation

Use of apparatus shown in the drawings for carrying out the process of the present invention will be readily understood from the foregoing description. The diamond powder to be molded together with any additives is placed in the cavity of the female mold 3 in such a way, e.g., using electrophoresis or catophoresis, as to make sure that the particles get down into the submicroscopic mold edge by the passage of an electric current in the presence of a magnetic field of suitable strength and configuration and are properly oriented. The filled and assembled mold is positioned together with heating element and pressure applying means in the frame 1. The envelope 17 is closed and the space within the envelope is evacuated to achieve an ultrahigh vacuum ($10^{-8}$ to $10^{-9}$ Torr.) and to thoroughly degas the diamond powder and the entire assembly inside the envelope. The required temperature and pressure are thereupon applied to effect a bonding of the powder and molding of the desired implement. When using a superconducting magnetic coil to provide the required pressure as illustrated in the drawng, the magnet is energized to effect and maintain orientation of the diamond particles. The magnetic field is built up gradually and then suddenly increased to produce a magnetic shock to effect the final molding and setting of the polycrystalline diamond implement. The magnetic field used in the range of 50,000 to 200,000 gauss.

As indicated above, the diamond particles in the mold are preferably oriented to present the 1-1-1 faces at the edge or point of the implement being molded. If it is desired to have certain additives only in certain portions of the implement the powder containing such additives is suitably positioned in the mold. Moreover, a metal insert or a lead for electrical connection can be inserted in the mold as desired.

Implement Produced According To The Invention

As will be understood from the foregoing explanation of the process, an implement formed in accordance with the invention has an ultrasharp edge or point which is defined by the mold in the molding operation. Subsequent finishing or polishing not only is unnecessary but is highly undesirable as it would disrupt the extremely fine edge achieved by the process of the present invention. Such edge has a sharpness defined by a radius which measures only 3 to 100 angstroms and is straight and uniform as in the case of a natural diamond knife as described in U.S. Pat. No. 3,646,841. However, in contrast with the natural monocrystalline diamond knife, a polycrystalline diamond implement made in accordance with the process of the present invention can be of any desired length.

If the implement is to be used for electrical purposes for example for the emission of electrons, ions, neutrons, X-rays, coherent or incoherent light and high frequency electromagnetic radiation, it is provided with inclusions of suitable material for example tungsten, rhenium, lanthanum, barium, caesium etc. as described above. Such inclusion may be throughout the implement or may be limited to local portions, for example the edge portion or a surface layer. Likewise, as described above, the molded implement may include bonding media such as alumina and lanthanum borate. When it is desired to make an electrical connection to the molded implement, a suitable metal insert or lead can be molded into it. It will be understood that many variations are made possible by the process in accordance with the invention. Thus the emitter may be in the form of an edge, a point or a comb or other shape with a plurality of points. Moreover, the point or points, instead of projecting, may be "negative" or female points, i.e., in the form of a sharp pointed cavity or recess. The included angle of the edge or point may be selected as desired, for example from 30° to 60° and the sides, instead of being planar, may be curved, e.g., hollow ground, if desired. Moreover, the cost of production of implements having ultrasharp edges or points is greatly reduced. The invention thus makes possible a significant extension of the use of diamond tools for cutting and of diamond edges and points for use as emitters.

Classification of the diamond powder used in carrying out the process of the present invention is important for the reason that best results are obtained with a power of approximately uniform particle size. For critical work it is desirable to have the particle size uniform with a range of 50 angstroms and preferably 20 angstroms. For a diamond knife having an ultrasharp cutting edge, it is desirable to use diamond powder having a particle size of 3 to 20 angstroms. If the implement is to be used as an emitter, the particle size of the diamond powder can be larger for example up to 100 angstroms. By reason of the ultrafine powder used and the pressure and temperature at which it is molded, it is possible to obtain by the process of the present invention a material having a density equal to that of a natural diamond. When additives are used which have a density higher than that of diamonds, the resulting product has a density higher than that of a natural diamond.

Advantages And Applications Of Ultrahard Materials Produced by Process of Invention In accordance with the present invention the features of ultrahigh vacuum, high field superconducting magnets, natural or polycrystalline synthetic diamond anvils with suitable "windows" for laser electron beam or radiation heating are all incorporated in a relatively simple and above all incomparably clean and precise high pressure diamond anvil apparatus which lends itself ideally to constant monitoring and direct observation of critical changes in temperature, fine structure as revealed by light microscopy, scanning electron microscopy and modified transmission electron microscopy and diffraction and determination of the properties of the finished ultrahard diamond-composite part at molecular and atomic levels by X-ray diffraction and scattering, laser interferometry, spectroscopy, etc. Moreover, the apparatus illustrated by way of example in the drawings can be readily scaled up in size merely by increasing the dimensions and strength of the magnetic field elements (for example larger superconductive magnets or nitrogen cooled high-field Bitter-type magnets, etc.) and the size of the anvils which can be made progressively larger by using new types of diamond-compacts of polycrystalline type.

A significant feature of the invention that has now been clearly demonstrated is the fact that the material produced in accordance with the invention both in the form of a so-called "polycrystalline diamond" or "synthetic carbonado" represents a totally different type of material. This appears to result at least in part from the uniformly ultrasmall particle size (3 to 100 angstroms and high surface to volume ratio of the diamond particles which are used. Up till now all of the reported sintered diamond or ultrahard diamond compacts of polycrystalline diamond with suitable solvent metal catalysts or admixtures have been made from diamond particles in the size range of 1 to 100 microns and no attempt has been made to classify or grade the particles. A cube which is 1 centimeter on a side has a total surface area of 6 square centimeters and a volume of 1 cubic centimeter and hence a surface area to volume ratio of 6 sq. cm/cm$^3$. A cube which is 1 micron on a side has a total surface area of $6 \times 10^{-8}$ square centimeters, a volume of $10^{-12}$ cubic centimeters and hence a surface area to volume ratio of 60,000 square centimeters/cubic centimeters. This large increase in surface area to volume ratio would be quite remarkable if anyone has succeeded in accurately classifying or grading the micron size powder and sintering it at high pressures and temperatures without oxidation. This is still an unattained goal. In the process of the present invention we are dealing with particles of about 0.01 micron or 100 angstroms in side dimensions and even though the particles are in the form of a more favorable platelet instead of a cube, the particles have a total surface area of the order of $6 \times 10^{-12}$ square centimeters, and a volume of $10^{-18}$ cubic centimeters with a surface area to volume ratio of the order of 6,000,000 square centimeters/cubic centimeters. The material produced in accordance with the invention is a polycrystalline ultrahard sintered material made up of either uniform ultrafine diamond particles in homogeneous array and in different orientations which would give a material resembling the glassy or vitreous state but incomparably harder with highest tensile strength and lowest thermal expansion coefficient. There is thus produced a new type of diamond glass or ceramic particularly in case of mixing ultrafine diamond particles with suitable bonding metals or catalytic solvents. There are thus achieved unique qualitative differences of this new material which goes well beyond a mere quantitative difference in size.

Moreover, it has been found that the same method and apparatus can be used to make synthetic diamond in polycrystalline form by using very pure ultrafine graphite prepared by high vacuum evaporation and then subjecting a mixture of these graphite crystallites having a particle size of about 10 to 50 angstroms with a wide variety of ultrafine metallic catalytic solvents such as iron, nickel, cobalt, chromium, manganese, palladium, iridium, platinum, tantalum, ruthenium, most of which belong to group VIII of the periodic table or with certain binary catalytic systems forming alloys composed typically of transition elements such as titanium, zirconium, niobium, molybdenum, tungsten and hafnium which belong to group IVa, Va or VIa of the periodic table combined with elements such as copper, silver or gold or group Ib of the period table. The ultrafine particles of the metallic materials are similarly prepared by high vacuum arc evaporation or sputtering in a noble gas atmosphere. The process in accordance with the present invention thus permits starting with pure ultrafine graphite instead of ultrafine diamond powder and to obtain diamond in polycrystalline form by the reaction of a metallic catalytic solvent or carbon under the same high pressures (for example 50 to 60 kb) and high temperatures (2000° K. to 2500° K.) required to attain the region of thermodynamic stability of diamond.

While preferred embodiments of the invention have been particularly described, it will be understood that many modifications may be made. For example other additives can be used with the ultrafine diamond or graphite powder and two or more additives can be used in the same article. For example alumina or lanthanum borate can be used jointly with a metal selected for its electron emission or other electrical properties. When one or more additive is used, the ultrafine diamond or graphite powder should constitute at least 50% and preferably at least 60% of the composition.

What is claimed is:

1. A polycrystalline diamond emitter having an ultrasharp edge or point, said emitter comprising a multiplicity of diamond particles molecularly bonded together with the cohesion of natural diamond, all of said diamond particles being of a size less than 100 angstroms and being uniform in size within a range of 50 angstroms, said diamond particles being uniformly oriented to present like faces to said edge or point to define a uniform edge or point having a radius of from 3 to 100 angstroms, said emitter having at least in the portion forming said edge or point uniform inclusions of low work function metal.

2. An emitter according to claim 1, in which said inclusions are selected from the group consisting of rare metals.

3. An emitter according to claim 2, in which said inclusions are selected from the group consisting of rare-earths.

4. An emitter according to claim 1, in which said inclusions are selected from the group consisting of tungsten, rhenium, lanthanum, barium and caesium.

5. An emitter according to claim 1, in which said diamond particles have 1-1-1 faces and are oriented to present said 1-1-1 faces at the edge or point of said emitter.

6. An emitter according to claim 1, in which said inclusions are in the form of coatings on individual diamond particles.

7. An emitter according to claim 1, in which said inclusions are in the form of particles interspersed with said diamond particles.

8. An emitter according to claim 1 in which said inclusions comprise thorium.

9. An emitter according to claim 1, in which an ultrafine additive selected from the group consisting of $LaB_4$ and $LaB_6$ is intimately mixed with said diamond particles.

10. An emitter according to claim 1, in which individual diamond particles are coated with metal selected from the group consisting of chromium, nickel, cobalt and iron, said metal coating acting as a matrix which contributes to the bonding of said diamond particles.

11. An emitter according to claim 1, in which said diamond particles comprise platelets having a thickness of the order of 6 angstroms and a length of 10 to 100 angstroms, said platelets being interlocked with one another to form a solid body.

* * * * *